US012659384B2

(12) United States Patent
Griffin et al.

(10) Patent No.: US 12,659,384 B2
(45) Date of Patent: Jun. 16, 2026

(54) DYNAMIC CLIENT-SPECIFIC DATA RETRIEVAL IN DISTRIBUTED COMPUTING ENVIRONMENTS

(71) Applicant: RED HAT, INC., Raleigh, NC (US)

(72) Inventors: Leigh Griffin, Waterford (IE); Aoife Moloney, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/212,789

(22) Filed: Jun. 22, 2023

(65) Prior Publication Data

US 2024/0430343 A1 Dec. 26, 2024

(51) Int. Cl.
| *G06F 16/182* | (2019.01) |
| *G06F 9/54* | (2006.01) |
| *G06F 16/955* | (2019.01) |
| *H04L 67/60* | (2022.01) |

(52) U.S. Cl.
CPC .............. *H04L 67/60* (2022.05); *G06F 9/547* (2013.01)

(58) Field of Classification Search
CPC ......... H04L 67/60; G06F 9/547; G06F 3/067; G06F 21/6218; G06F 3/0604; G06F 11/0709
See application file for complete search history.

(56) References Cited

U.S. PATENT DOCUMENTS

| 10,893,108 | B2 | 1/2021 | Jeuk et al. |
| 11,258,873 | B2 | 2/2022 | Mueck et al. |
| 11,272,035 | B1 * | 3/2022 | Wu ........................ H04L 67/02 |
| 11,405,462 | B1 | 8/2022 | Puchalski et al. |
| 11,995,296 | B2 * | 5/2024 | Shaw ....................... G06F 9/451 |
| 2003/0061404 | A1 * | 3/2003 | Atwal .................... G06Q 30/04 |
| | | | 719/328 |
| 2018/0074873 | A1 * | 3/2018 | Iqbal ................... G06F 11/1471 |
| 2018/0109433 | A1 * | 4/2018 | Nagaraj .................. H04L 43/12 |
| 2021/0216510 | A1 * | 7/2021 | Falter .................. G06F 21/6218 |

(Continued)

FOREIGN PATENT DOCUMENTS

| EP | 3867854 A1 | 8/2021 |
| WO | 2022215086 A1 | 10/2022 |

OTHER PUBLICATIONS

"Mercedes-Benz R&D creates "container-driven cars" powered by Microsoft Azure", https://customers.microsoft.com/esmx/story;784791-mercedes-benz-r-and-d-creates-container-driven-cars-powered-by-microsoft-azure, Microsoft, Mar. 27, 2020; pp. 1-10.

*Primary Examiner* — Nicholas R Taylor
*Assistant Examiner* — Ho T Shiu
(74) *Attorney, Agent, or Firm* — Kilpatrick Townsend & Stockton LLP

(57) ABSTRACT

Dynamic, client-specific retrieval of data can be performed for edge devices using data services. For example, a system can receive a data request from a client device. The data request can include a type of data and one or more parameters for the type of data. In response to receiving the data request, the system can further detect data services that include the type of data. Additionally, the system can generate application programming interface (API) contracts. Each of the API contracts can define a communication protocol between the client device and each of the data services. The system can also deploy a deployable object, which may include the API contracts, on the client device to cause the client device to receive data satisfying the data request from each of the data services.

18 Claims, 3 Drawing Sheets

(56) References Cited

U.S. PATENT DOCUMENTS

| | | | |
|---|---|---|---|
| 2021/0303298 A1* | 9/2021 | Sazhin | G06F 8/77 |
| 2022/0027942 A1 | 1/2022 | Grover | |
| 2022/0116755 A1 | 4/2022 | Filippou et al. | |
| 2023/0209583 A1* | 6/2023 | Gonzalez Tejeria | H04W 72/535 |
| | | | 370/329 |
| 2023/0267018 A1* | 8/2023 | Bakshi | G06F 9/541 |
| | | | 719/328 |
| 2024/0179146 A1* | 5/2024 | Pinski | H04L 63/105 |

* cited by examiner

300

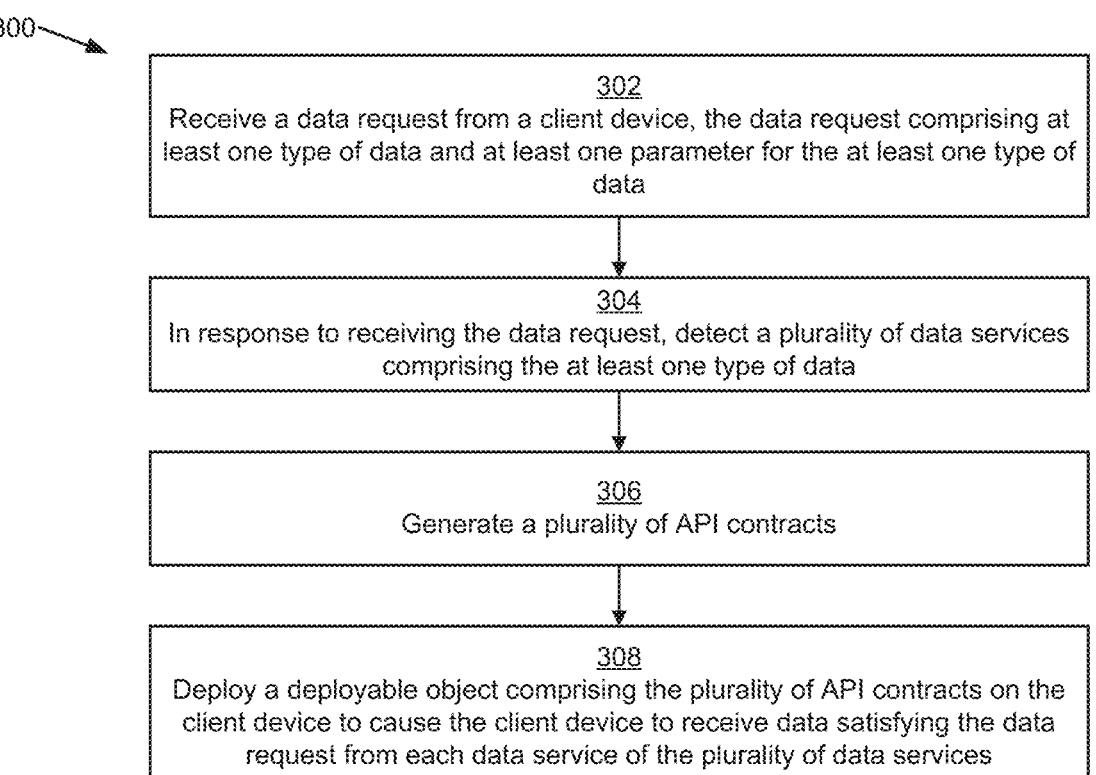

302
Receive a data request from a client device, the data request comprising at least one type of data and at least one parameter for the at least one type of data

304
In response to receiving the data request, detect a plurality of data services comprising the at least one type of data

306
Generate a plurality of API contracts

308
Deploy a deployable object comprising the plurality of API contracts on the client device to cause the client device to receive data satisfying the data request from each data service of the plurality of data services

FIG. 3

DYNAMIC CLIENT-SPECIFIC DATA RETRIEVAL IN DISTRIBUTED COMPUTING ENVIRONMENTS

TECHNICAL FIELD

The present disclosure relates generally to distributed computing environments and, more particularly not necessarily exclusively, to retrieving data from data services in distributed computing environments.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage.

In the edge-computing solutions, devices at an edge of the distributed computing environment that generate or consume data can be referred to as edge devices. The distributed computing environments may then employ edge nodes to perform various functions at the edge. For example, the edge nodes can store, perform local processing on, or perform other suitable tasks with respect to data generated at the edge devices. Data services may also be employed and may be associated with the edge nodes to enhance, organize, share, or generate metadata for the data generated at the edge devices.

BRIEF DESCRIPTION OF THE DRAWINGS

FIG. 3 is a flowchart of a process for retrieving data from data services according to one example of the present disclosure.

DETAILED DESCRIPTION

Figure 1:
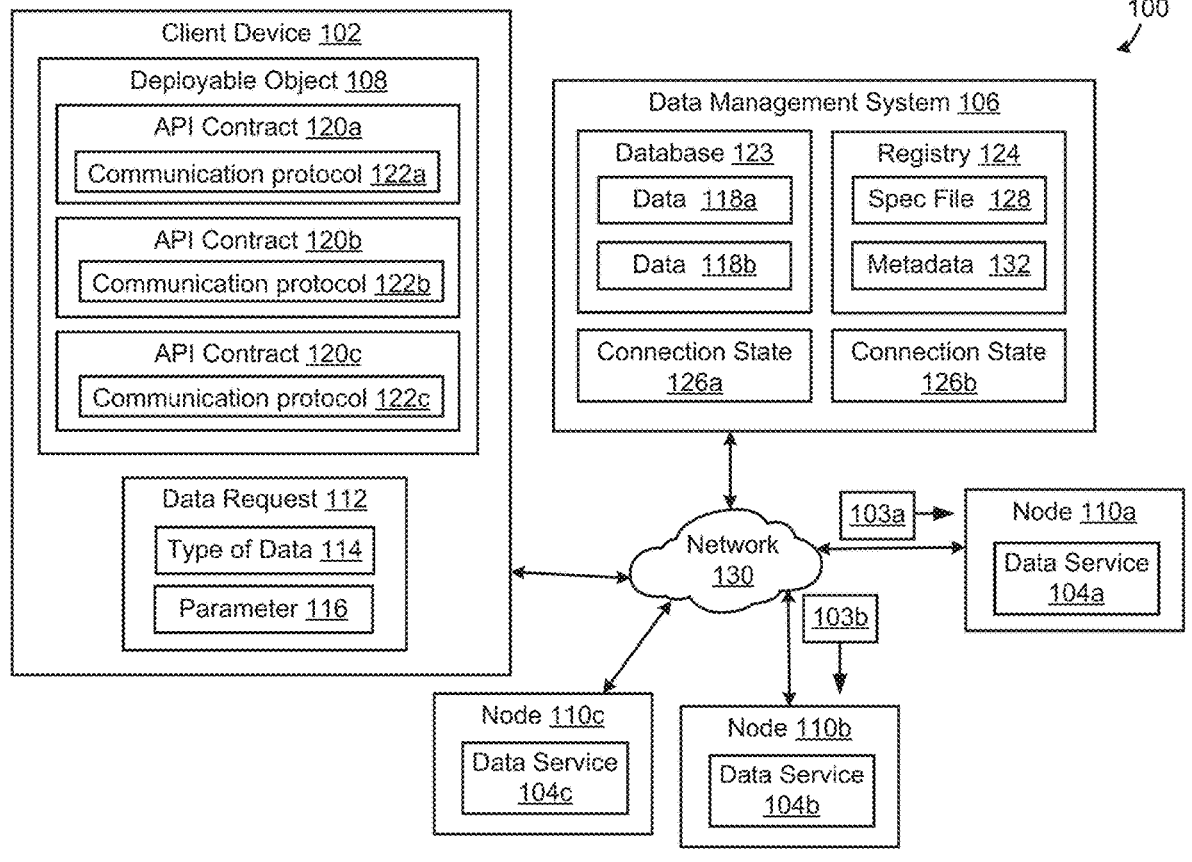
FIG. 1 is a block diagram of an example of a distributed computing environment for retrieving data from data services according to one example of the present disclosure.

Some devices, such as edge devices, can be characterized by inherent mobility. As a result, network connectivity and access ranges of the edge devices may be inconsistent. The network connectivity can refer to the ability of the edge devices to establish and maintain connections with data services, edge nodes, other devices, or the like via wireless communication (e.g., Wi-Fi, cellular networks, etc.). The mobility of the edge devices may cause disruption to any number of the connections. For example, a data service may be within an access range of an edge device in a first location. But, the data service may not be within the access range when the edge device is in a second location, which may cause disruption to or termination of a network connection between the edge device and the data service.

Additionally, the edge devices may interact with data sources (e.g., the data services or the other devices) within the access range to receive data. However, some data sources may provide a high volume of data, irrelevant data, or a combination thereof to the edge device. As a result of receiving the high volume of data, the edge device may experience latency in system performance, task performance, data processing, etc. The high volume of data may further cause network congestion for a network associated with the edge device, which may impact the ability of the edge device to receive data from multiple data sources. Moreover, the high volume of data and the irrelevant data can make it difficult for the edge device to identify important data, which may hinder performance of certain tasks by the edge device.

Some examples of the present disclosure overcome one or more of the abovementioned problems via a data management system that can perform dynamic, client-specific data retrieval using data services. For example, the data management system can automatically detect data services that are in an access range of an edge device and have a particular type of data. The data management system can then generate application programming interface (API) contracts between the data services and the edge device that specify in what manner data should be received from the data services. For example, the API contract can include a frequency at which batches of data are to be received, an amount of data to be received in each batch, etc. The API contracts can further define parameters for the data. For example, the API contract may specify that the data received is to have values above, below, or within a particular value range. In this way, the data management system can decrease a volume of data and increase a relevancy of the data received from the data services to reduce latency and network congestion. The decrease in volume and increase in relevancy can further enable the edge device to identify important information more efficiently.

Additionally, the data management system can deploy a deployable object (e.g., a container, virtual machine, software service, or the like) on the edge device that includes the API contracts. The data management system can also transmit connection requests (e.g., pings or heartbeat messages) during movement of the edge device to assess whether the connections between the edge device and the data service remain active or have been disrupted. For data services for which the connections have been disrupted, the data management system may deactivate the corresponding API contracts, thereby preventing additional attempts to retrieve data from the data services. The data management system may also remove the corresponding API contracts from the deployable object. Additionally, during movement of the edge device, the data management system may detect new data services within the access range of the edge device. Consequently, the data management system can generate new API contracts for the new data services and can update the deployable object to include the new API contracts. Therefore, the data management system can continually update the deployable object to exclude out of range data services and include in range data services to optimize computational resources and to account for the mobility of the edge device.

In one particular example, the data management system can receive a data request from a client device (e.g., an edge device). The data request can include a type of data and one or more parameters for the type of data. For example, the client device can be an autonomous vehicle and the type of data can be temperature data. Additionally, parameters for the type of data can specify data below ten degrees Celsius and above twenty-five degrees Celsius is requested. In response to receiving the data request, the data management system can detect data services that include the type of data. For example, the data management system may detect a first data service associated with weather data providers and a second data service associated with Internet of Things (IoT) temperature sensors.

The data management system may then generate API contracts to define communication protocols between the autonomous vehicle and the data services. For example, a first API contract can define constraints for data transmission between the autonomous vehicle and the first data service and a second API contract can define constraints for data transmission between the second data service and the autonomous vehicle. In particular, the first and second API contracts can include the type of data and the parameters to cause data satisfying the data request to be retrieved from the data services. The first and second API contracts may further include constraints specific to the data services. For example, the first data service may include historical temperature data, and the first API contract may specify a timeframe from which temperature data satisfying the parameters is to be transmitted.

The data management system can further generate a deployable object that includes the API contracts. For example, data management system may generate a container that includes the API contracts, and can deploy the container on the autonomous vehicle to cause the autonomous vehicle to retrieve data satisfying the data request from the data services. In this way, the data management system can provide a means for the autonomous vehicle to efficiently collect relevant data from which informed decisions regarding the autonomous vehicle can be made. For example, an air conditioning or heating setting can be automatically adjusted within the autonomous vehicle based on the temperature data received from the first and second data services.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a distributed computing environment 100 for retrieving data from data services according to one example of the present disclosure. Components within the distributed computing environment 100 may communicate using a network 130, such as the Internet or other suitable wide area network. The distributed computing environment 100 can include a client device 102, a data management system 106, and nodes 110a-c. The nodes 110a-c can be edge nodes that may be located physically close to or within an access range of the client device 102. The nodes 110a-c can be responsible for data processing, analysis, storage, or a combination thereof within the distributed computing environment 100. Examples of the nodes 110a-c can include servers, routers, controllers, or other suitable types of edge nodes. Example of the nodes 110a-c may further include resource-constrained devices, such as microcontrollers, smart devices, sensors, etc. Additionally, examples of the client device 102 may include edge devices, such as smartphones, tablets, wearable devices, vehicles, Internet of Things (IoT) devices, etc.

Data can be generated at or transmitted to the nodes 110a-c, and data services 104a-c associated with nodes 110a-c can retrieve the data, store the data, analyze the data, manage the data, secure the data, or a combination thereof. The nodes 110a-c may then transmit the data to the client device 102 for use in performing tasks. For example, the client device 102 may derive meaningful insights, identify patterns, detect anomalies, etc. from the data. Additionally, by receiving data from multiple sources (e.g., the nodes 110a-c), the client device 102 can make more informed decisions, have a comprehensive or accurate understanding of an environment or situation, etc. In order to improve task performance by the client device 102, the data management system 106 can be implemented to control the flow of data from the nodes 110a-c to the client device 102.

For example, the data management system 106 can receive a data request 112 from the client device 102. The data request 112 can indicate a type of data 114 being requested and a parameter 116 for the type of data 114. The type of data 114 can be any suitable type of data (e.g., sensor data, image data, audio data, network data, location data, environmental data, biometric data, etc.) collected by the nodes 110a-c. Additionally, the parameter 116 can define data of interest from the type of data 114, such as by providing a range of values or other suitable constraint for the type of data 114.

In a particular example, the client device 102 can be a smartphone and a data request 112 can be transmitted for data associated with traffic patterns. The client device 102 may use the data associated with traffic patterns for a navigation application executing on the client device 102. The data request 112 can include that the type of data 114 being requested is vehicle speeds. Additionally, the parameter 116 can specify that data is desired for below particular speed (e.g., below thirty miles per hour).

The data management system 106 can further detect data services that include or provide the type of data 114. In the particular example, the nodes 110a-c may receive data indicative of vehicle speed, road conditions, etc. from vehicle sensors, traffic cameras, or other suitable devices. The data services 104a-c may perform local processing, analysis, or a combination thereof on the data. Therefore, in response to the data request 112, the data management system 106 may detect a first data service 104a associated with a first node 110a and a second data service 104b associated with a second node 110b that each are associated with the type of data 114. The data management system 106 may detect the data services 104a-b based on the nodes 110a-b being within the access range of the client device 102, when the client device 102 is in a first location.

The data management system 106 may then generate application programming interface (API) contracts for each of the data services 104a-c that satisfy the data request 112. For example, the data management system 106 may generate a first API contract 120a between the client device 102 and the first data service 104a. The data management system 106 may also generate a second API contract 120b between the client device 102 and the second data service 104b. The API contracts 120a-b can each define communication protocols 122a-b between the client device 102 and the data services 104a-b based on the data request 112. For example, the API contracts 120a-b can specify that vehicle speed data under thirty miles per hour (MPH) is to be received from the data services 104a-b. The API contracts 120a-b can further include additional specifications for communication between the client device 102 and the data service 104a-b, such as how often batches of data are to be received at the client device 102 from the data services 104a-b, how much data is to be transmitted in each batch, etc. By implementing the communication protocols 122a-b via the API contracts 120a-b, the retrieval of data from the data services 104a-b can be enhanced to improve data processing at the client device 102. For example, by including the type of data 114, the parameter 116, additional specifications, or a combination thereof, the volume of data received at the client device 102 can be reduced and the relevancy of the data received at the client device 102 can be increased.

Additionally, the data management system 106 can generate a deployable object 108 that can includes the API contracts 120a-b. The deployable object 108 can be a software mechanism for packaging, transmitting, or a combination thereof the API contracts for execution at the client device 102 or other suitable devices. In some examples, the deployable object 108 can be a container or virtual machine in which the API contracts 120a-b can be deployed. Additionally, in some examples, the deployable object 108 can be a software application or service.

The data management system 106 can further deploy the deployable object 108 on the client device 102. The client device 102 can then execute the deployable object 108 to cause API calls to be transmitted to the data services 104a-b. In response to the API calls, the data services 104a-b can transmit data 118a-b satisfying the data request 112 to the client device 102. Due to the deployable object 108 including the API contracts 120a-b, the data 118a-b can be transmitted in accordance with the communication protocols 122a-b of the API contracts 120a-b. In this way, the data 118a-b received can be relevant to the client device 102 and can be processed with reduced latency. This can further enable the client device 102 to perform tasks (e.g., identifying meaningful insights, patterns, anomalies, or the like) more efficiently. In the particular example, the data 118a-b can be used by the navigation application executing on the client device 102 to detect nearby traffic or to provide an estimated time of arrival to a particular location to a user of the client device 102. The data management system 106 can also store the data 118a-b in a database 123 for future use.

In some examples, the client device 102 can change location continuously or intermittently. Therefore, after deploying the deployable object 108, the data management system 106 may determine connection states 126a-b of the nodes 110a-b. The data management system 106 may determine the connection states 126a-b using keep alive mechanisms, such as a ping approach. For the ping approach, the data management system 106 may transmit connection requests 103a-b (e.g., pings or heartbeat messages) to the nodes 110a-b. The data management system 106 may then determine the connection states 126a-b based on whether data or another suitable indication of the nodes 110a-b being within the access range of the client device 102 is received. Additionally, the data management system 106 may transmit the connection requests 103a-b repetitively to continuously determine the connection states 126a-b. For example, the data management system 106 may transmit a connection request every predetermined amount of time (e.g., every five minutes).

In an example, the data management system 106 may transmit a first connection request 103a to the first node 110a. The first node 110a may transmit data or another suitable indication of connection to the data management system 106 in response to the first connection request 103a. As a result, the data management system 106 can determine that the first node 110a is in communication with (i.e., within the access range of) the client device 102, and may not change the deployable object 108.

The data management system 106 may further transmit a second connection request 103b to the second node 110b. The second node 110b may not transmit data or another suitable indication of connection in response to the second connection request 103b. As a result, the data management system 106 may determine that the second node 110b is not in communication with (i.e., no longer within the access range of) the client device 102. The data management system 106 may then update the deployable object 108 to deactivate the second API contract 120b or may remove the second API contract 120b from the deployable object 108.

Alternatively, in response the second connection request 103b, the second node 110b may transmit data. But, the data management system 106 may detect an issue with the data. For example, the data management system 106 may detect that the portions of the data are missing or malformed. As a result of detecting the issue with the data, the data management system 106 may also deactivate or remove the second API contract 120b.

Additionally, due to the mobility of the client device 102, the data management system 106 may continuously detect data services. For example, the client device 102 may be in the first location when the data management system 106 detected the first and second data services 104a-b. Then, the client device 102 may move to a second location, from which the first node 110a may be within the access range and the second node 110b may be out of the access range of the client device 102. At the second location, the data management system 106 may detect a third data service 104c associated with a third node 110c. As a result, the data management system 106 may generate a third API contract 120c between the third data service 104c and the client device 102. The third API contract 120c can define a third communication protocol 122c based on the data request 112.

The data management system 106 may then update the deployable object 108 to include the third API contract 120c to cause the deployable object 108 to begin retrieving additional data satisfying the data request 112 from the third data service 104c. Therefore, by transmitting connection requests to previously detected data services, continuously detecting additional data services, and updating the deployable object 108 accordingly, the data management system 106 can account for the mobility of the client device 102. In this way, the data management system 106 can ensure that data is received efficiently at the client device 102 and can optimize the use of computational resources.

Additionally, the data management system 106 may generate metadata 132 for the deployable object 108. The metadata 132 can include a location of the client device 102, locations of the nodes 110a-c, or other suitable data associated with the client device 102, the nodes 110a-c, or the data services 104a-c. The data management system 106 may also generate a specification (spec) file 128 for the deployable object 108. The spec file 128 can be used to build software packages, which are used for installing software applications, such as the deployable object 108. The spec file 128 can include package names, versions, copyright information, a summary, references to program files, instructions for creating and installing the packages, etc.

The data management system 106 may further store the spec file 128, the metadata 132, or a combination thereof in a registry 124. The spec file 128, the metadata 132, or a combination thereof can be used by the data management system 106 to efficiently deploy the deployable object 108 or a similar deployable object at other client devices. For example, the data management system 106 may receive data requests from the other client devices that are the same or similar to the data request 112 or may detect that the other client devices are located close to the first or second location. In response, the data management system 106 can deploy a deployable object at the other client devices that include the API contracts 120*a-c*.

Figure 2:
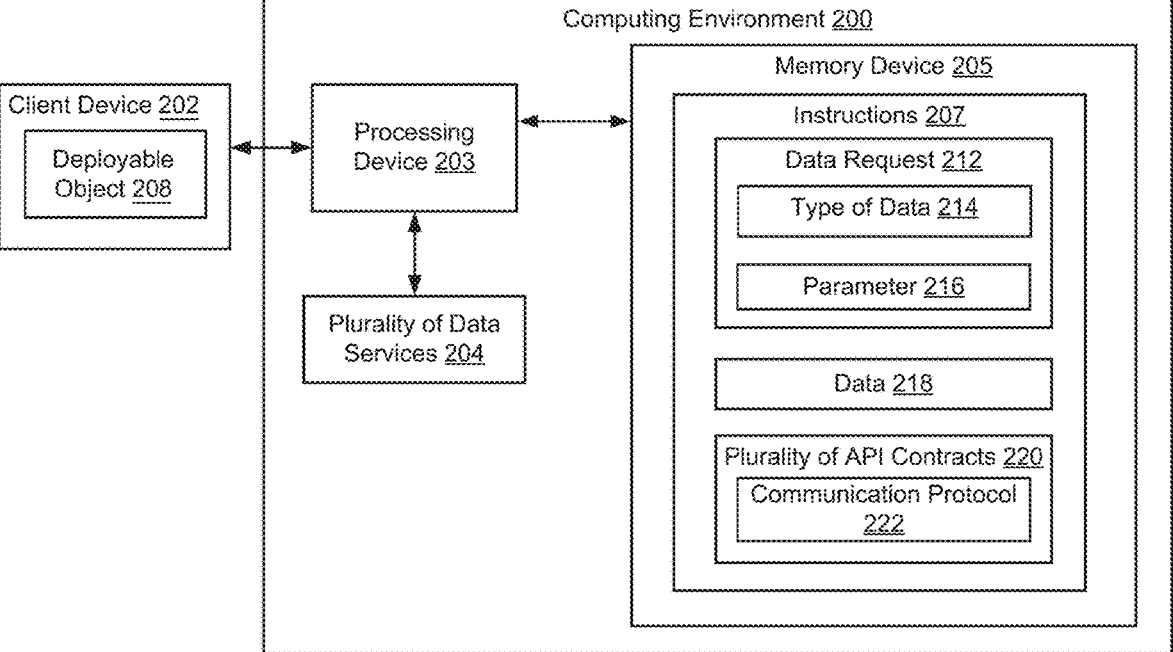
FIG. 2 is a block diagram of another example of a distributed computing environment for retrieving data from data services according to one example of the present disclosure.

FIG. 2 is a block diagram of another example of a distributed computing environment 200 for retrieving data from data services according to one example of the present disclosure. The distributed computing environment 200 depicted in FIG. 2 includes a processing device 203 communicatively coupled with a memory device 205. As depicted in FIG. 2, the processing device 203 and the memory device 205 can be part of an edge node, such as a first node 110*a*.

The processing device 203 can include one processing device or multiple processing devices. Non-limiting examples of the processing device 203 include a Field-Programmable Gate Array (FPGA), an application-specific integrated circuit (ASIC), a microprocessor, etc. The processing device 203 can execute instructions 207 stored in the memory device 205 to perform operations. In some examples, the instructions 207 can include processor-specific instructions generated by a compiler or an interpreter from code written in any suitable computer-programming language, such as C, C++, C#, etc.

The memory device 205 can include one memory or multiple memories. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. At least some of the memory can include a non-transitory computer-readable medium from which the processing device 203 can read instructions 207. The non-transitory computer-readable medium can include electronic, optical, magnetic, or other storage devices capable of providing the processing device with computer-readable instructions or other program code. Examples of the non-transitory computer-readable medium include magnetic disk(s), memory chip(s), ROM, RAM, an ASIC, a configured processor, optical storage, or any other medium from which a computer processor can read the instructions 207.

In some examples, the processing device 203 can receive a data request 212 from a client device 202. The data request 212 can include at least one type of data 214 and at least one parameter 216 for the type of data 214. In response to receiving the data request 212, the processing device 203 can detect a plurality of data services 204 comprising the type of data 214. The processing device 203 can further generate a plurality of API contracts 220. Each of the API contracts 220 can define a communication protocol 222 between the client device 202 and each of the data services 204 based on the data request 212. The processing device 203 may then deploy a deployable object 208, which can include the API contracts 220, on the client device 202 to cause the client device 202 retrieve data 218 satisfying the data request 212 from each of the data services 204.

FIG. 3 is a flowchart of a process for retrieving data from data services according to one example of the present disclosure. In some examples, the processing device 203 can implement some or all of the steps shown in FIG. 3. Additionally, in some examples, the processing device 203 can be executing the data management system 106 of FIG. 1 to implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processing device 203 can receive a data request 212 from a client device 202. The data request 212 can include at least one type of data 214 and at least one parameter 216 for the at least one type of data 214. In an example, the client device 202 can be car, and the types of data 214 may include weather data or other suitable data types indicative of road conditions. The parameters 216 can be constraints to specify data of interest within the types of data 214 that are requested. For example, the parameters 216 applied can indicate that data associated with adverse road conditions is desired.

At block 304, the processing device 203 can, in response to receiving the data request 212, detect a plurality of data services 204 comprising the at least one type of data 214. The data services 204 can be associated with edge nodes, such as nodes 110*a-c* of FIG. 1. The data services 204 can process, analyze, store, or a combination thereof data collected by or received at the nodes 110*a-c*. In the example, a first data service 104*a* associated with a first node 110*a* may be detected and may include precipitation data as collected by the first node 110*a*. Additionally, in the example, a second data service 104*b* associated with a second node 110*b* may be detected, and may include temperature data as received at the second node 110*b*.

At block 306, the processing device 203 can generate a plurality of API contracts 220. Each of the API contracts 220 can define a communication protocol 222 between the client device 202 and each of the data services 204 based on the data request 212. Thus, via the API contracts 220, the processing device 203 can define the data desired from the data services 204 based on the data request 212. The API contracts 220 may also define aspects of data transmission such as how often data should be transmitted from the data services 204 to the client device 202. In the example, the processing device 203 can generate a first API contract 120*a* with a first communication protocol 122*a* that indicates a range of participation data desired from the first data service 104*a*. Additionally, the processing device 203 can generate a second API contract 120*b* with a second communication protocol 122*b* that indicates a range of temperature data desired from the second data service 104*b*.

At block 308, the processing device 203 can deploy a deployable object 208 including the plurality of API contracts 220 on the client device 202 to cause the client device 102 to receive data 218 satisfying the data request 212 from each data service of the plurality of data services 204. The deployable object 208 can be a software service, software application, container, virtual machine, etc. The client device 202 may use the data 218 collected via the deployable object 208. For example, the client device 202 may determine, based on the data 218 collected from the data services 104*a-b*, a safe route to a location and may provide the route to a user of the client device 202.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
a processing device; and

9 a memory device that includes instructions executable by the processing device for causing the processing device to perform operations comprising:

receiving a data request from a client device, the data request comprising at least one type of data and at least one parameter for filtering the at least one type of data;

in response to receiving the data request, detecting a plurality of data services comprising the at least one type of data, each data service of the plurality of data services is associated with a node of a plurality of nodes;

generating a plurality of application programming interface (API) contracts, each API contract of the plurality of API contracts defining a communication protocol between the client device and each data service of the plurality of data services based on the data request, the communication protocol indicating the at least one parameter;

deploying a deployable object comprising the plurality of API contracts on the client device to cause the client device to receive data satisfying the data request from each data service of the plurality of data services, the data being filtered based on the at least one parameter;

subsequent to executing the deployable object, determining a connection state of a node of the plurality of nodes to the client device by transmitting a connection request to the node, the connection state being based on a first location of the node relative to a second location of the client device, and the connection state being updated in association with a movement of the client device within a distributed computing environment; and updating the deployable object at the client device based on the connection state of the node by adding or removing an API contract corresponding to the node.

2. The system of claim 1, wherein the operation of updating the deployable object based on the connection state of the node comprises:

determining, based on the connection state of the node, that the node is out of range with respect to the client device; and in response to determining that the node is out of range with respect to the client device, deactivating an API contract of the plurality of API contracts corresponding to the node.

3. The system of claim 1, wherein the data is first data, and the operation of determining the connection state of the node further comprises:

subsequent to transmitting the connection request, receiving second data from the node; and detecting an issue with the second data by detecting that at least a portion of the second data is missing or by detecting that at least a portion of the second data is malformed.

4. The system of claim 1, wherein the memory device further includes instructions executable by the processing device for causing the processing device to perform operations comprising:

subsequent to executing the deployable object, detecting an additional data service that comprises the at least one type of data;

generating an API contract between the additional data service and the client device; and

updating the deployable object to include the API contract to cause the client device to receive additional data satisfying the data request from the additional data service.

5. The system of claim 1, wherein the memory device further includes instructions executable by the processing device for causing the processing device to perform operations comprising:

generating metadata for the deployable object, wherein the metadata comprises at least a location of the client device.

6. The system of claim 5, wherein the client device is a first client device and wherein the memory device further includes instructions executable by the processing device for causing the processing device to perform operations comprising:

storing a specification file associated with the deployable object in a registry and storing the metadata for the deployable object in the registry; and deploying, using the metadata and the specification file stored in the registry, the deployable object at a second client device.

7. A method comprising:

receiving, by a processing device, a data request from a client device, the data request comprising at least one type of data and at least one parameter for filtering the at least one type of data;

in response to receiving the data request, detecting, by the processing device, a plurality of data services comprising the at least one type of data, each data service of the plurality of data services is associated with a node of a plurality of nodes;

generating, by the processing device, a plurality of application programming interface (API) contracts, each API contract of the plurality of API contracts defining a communication protocol between the client device and each data service of the plurality of data services based on the data request, the communication protocol indicating the at least one parameter;

deploying, by the processing device, a deployable object comprising the plurality of API contracts on the client device to cause the client device to receive data satisfying the data request from each data service of the plurality of data services, the data being filtered based on the at least one parameter;

subsequent to executing the deployable object, determining a connection state of a node of the plurality of nodes to the client device by transmitting a connection request to the node, the connection state being based on a first location of the node relative to a second location of the client device, and the connection state being updated in association with a movement of the client device within a distributed computing environment; and updating the deployable object at the client device based on the connection state of the node by adding or removing an API contract corresponding to the node.

8. The method of claim 7, wherein updating the deployable object based on the connection state of the node comprises:

determining, based on the connection state of the node, that the node is out of range with respect to the client device; and in response to determining that the node is out of range with respect to the client device, deactivating an API contract of the plurality of API contracts corresponding to the node.

9. The method of claim 7, wherein the data is first data, and determining the connection state of the node further comprises:

subsequent to transmitting the connection request, receiving second data from the node; and detecting an issue with the second data by detecting that at least a portion of the second data is missing or by detecting that at least a portion of the second data is malformed.

10. The method of claim 7, further comprising:

subsequent to executing the deployable object, detecting an additional data service that comprises the at least one type of data;

generating an API contract between the additional data service and the client device; and updating the deployable object to include the API contract to cause the client device to receive additional data satisfying the data request from the additional data service.

11. The method of claim 7, further comprising:

generating metadata for the deployable object, wherein the metadata comprises at least a location of the client device.

12. The method of claim 11, wherein the client device is a first client device and wherein the method further comprises:

storing a specification file associated with the deployable object in a registry and storing the metadata for the deployable object in the registry; and deploying, using the metadata and the specification file stored in the registry, the deployable object at a second client device.

13. A non-transitory computer-readable medium comprising instructions that are executable by a processing device for causing the processing device to perform operations comprising:

receiving a data request from a client device, the data request comprising at least one type of data and at least one parameter for filtering the at least one type of data;

in response to receiving the data request, detecting a plurality of data services comprising the at least one type of data, each data service of the plurality of data services is associated with a node of a plurality of nodes;

generating a plurality of application programming interface (API) contracts, each API contract of the plurality of API contracts defining a communication protocol between the client device and each data service of the plurality of data services based on the data request, the communication protocol indicating the at least one parameter;

deploying a deployable object comprising the plurality of API contracts on the client device to cause the client device to receive data satisfying the data request from each data service of the plurality of data services, the data being filtered based on the at least one parameter;

subsequent to executing the deployable object, determining a connection state of a node of the plurality of nodes to the client device by transmitting a connection request to the node, the connection state being based on a first location of the node relative to a second location of the client device, and the connection state being updated in association with a movement of the client device within a distributed computing environment; and updating the deployable object at the client device based on the connection state of the node by adding or removing an API contract corresponding to the node.

14. The non-transitory computer-readable medium of claim 13, wherein the operation of updating the deployable object based on the connection state of the node comprises:

determining, based on the connection state of the node, that the node is out of range with respect to the client device; and in response to determining that the node is out of range with respect to the client device, deactivating an API contract of the plurality of API contracts corresponding to the node.

15. The non-transitory computer-readable medium of claim 13, wherein the data is first data, and the operation of determining the connection state of the node further comprises:

subsequent to transmitting the connection request, receiving second data from the node; and detecting an issue with the second data by detecting that at least a portion of the second data is missing or by detecting that at least a portion of the second data is malformed.

16. The non-transitory computer-readable medium of claim 13, further comprising instructions executable by the processing device for causing the processing device to perform operations comprising:

subsequent to executing the deployable object, detecting an additional data service that comprises the at least one type of data;

generating an API contract between the additional data service and the client device; and updating the deployable object to include the API contract to cause the client device to receive additional data satisfying the data request from the additional data service.

17. The non-transitory computer-readable medium of claim 13, further comprising instructions executable by the processing device for causing the processing device to perform operations comprising:

generating metadata for the deployable object, wherein the metadata comprises at least a location of the client device.

18. The non-transitory computer-readable medium of claim 13, wherein the deployable object comprises a container or a virtual machine.

* * * * *